United States Patent
Ferretti et al.

(10) Patent No.: US 9,985,345 B2
(45) Date of Patent: May 29, 2018

(54) METHODS FOR ELECTRICALLY ISOLATING AREAS OF A METAL BODY

(71) Applicant: Apple Inc., Cupertino, CA (US)

(72) Inventors: Francesco Ferretti, Morgan Hill, CA (US); Joseph B. Marcinkowski, Mountain View, CA (US); Collin D. Chan, Dublin, CA (US); Tom H. Engbersen, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 0 days. days.

(21) Appl. No.: 14/971,791

(22) Filed: Dec. 16, 2015

(65) Prior Publication Data

US 2016/0302319 A1 Oct. 13, 2016

Related U.S. Application Data

(60) Provisional application No. 62/146,155, filed on Apr. 10, 2015.

(51) Int. Cl.
*H01Q 1/42* (2006.01)
*H04M 1/02* (2006.01)

(52) U.S. Cl.
CPC .......... *H01Q 1/42* (2013.01); *H04M 1/0202* (2013.01)

(58) Field of Classification Search
CPC .......... H01Q 1/42; H01Q 1/243; H01Q 1/40; H04M 1/0249; H04M 1/0202; C25D 11/04; H05K 5/04

(Continued)

(56) References Cited

U.S. PATENT DOCUMENTS

| 3,344,322 A | * | 9/1967 | Dill | ........................ | H01L 21/00 257/331 |
| RE27,089 E | * | 3/1971 | Sear et al. | ........... | H05K 1/0221 174/262 |

(Continued)

FOREIGN PATENT DOCUMENTS

| CN | 103297565 A | | 9/2013 |
| CN | 103930600 A | | 7/2014 |
| WO | 2011051408 | * | 5/2011 |

OTHER PUBLICATIONS

International Application No. PCT/2014/040327—International Search Report and Written Opinion dated Sep. 24, 2014.

(Continued)

*Primary Examiner* — Janet M Wilkens
(74) *Attorney, Agent, or Firm* — Dickinson Wright RLLP

(57) ABSTRACT

Unitary structures having conductive portions electrically separated by non-conductive portions are described. In some embodiments, the non-conductive portions are made of metal oxide. In some embodiments, the method involves an oxidizing process adapted to convert an entire thickness at a selected portion of a metal substrate to a metal oxide, thereby creating metal portions that are electrically isolated from one another. In some embodiments, the thickness of the metal substrate is reduced at certain regions prior to oxidizing in order to provide a sufficiently thin metal for complete oxidization through the entire thickness. In some embodiments, the oxidizing process involves a plasma electrolytic oxidation process. In some embodiments, the plasma is concentrated at certain regions of the substrate for preferential oxidation. Applications for the substrate include enclosures and electrical components for electronic devices that use radio frequency communication.

20 Claims, 14 Drawing Sheets

(58) Field of Classification Search
USPC ............... 343/702; 361/100; 455/575.1, 128; 312/7.1, 223.1, 223.2
See application file for complete search history.

(56) References Cited

U.S. PATENT DOCUMENTS

| | | | |
|---|---|---|---|
| 3,671,819 A * | 6/1972 | Swanson | H01L 21/762 |
| | | | 148/DIG. 106 |
| 4,542,579 A | 9/1985 | Poponiak et al. | |
| 5,898,413 A * | 4/1999 | Mandai | H01Q 1/243 |
| | | | 343/702 |
| 6,149,792 A | 11/2000 | Chakravorty | |
| 6,310,385 B1 | 10/2001 | Ajit | |
| 7,498,392 B2 | 3/2009 | Nelson | |
| 8,102,321 B2 | 1/2012 | Chiang et al. | |
| 8,185,166 B2 * | 5/2012 | Weber | H01Q 1/243 |
| | | | 361/679.56 |
| 8,269,675 B2 | 9/2012 | Kough et al. | |
| 8,325,094 B2 | 12/2012 | Ayala Vazquez et al. | |
| 8,812,062 B2 * | 8/2014 | Hata | H01Q 1/22 |
| | | | 455/269 |
| 9,109,093 B2 * | 8/2015 | Pilliod | B29C 45/0005 |
| 9,152,038 B2 * | 10/2015 | Browning | B23P 11/00 |
| 9,300,036 B2 | 3/2016 | Misra et al. | |
| 9,343,804 B2 * | 5/2016 | Oh | H01Q 1/243 |
| 9,516,150 B2 * | 12/2016 | Jeon | C25D 5/48 |
| 9,564,938 B1 * | 2/2017 | Wang | H04B 1/3827 |
| 9,608,308 B2 * | 3/2017 | Song | H01Q 1/241 |
| 9,627,749 B2 | 4/2017 | Misra et al. | |
| 2006/0183342 A1 | 8/2006 | Bruyns et al. | |
| 2006/0205156 A1 | 9/2006 | Mouli | |
| 2008/0191948 A1 | 8/2008 | Hu et al. | |
| 2010/0045538 A1 | 2/2010 | East et al. | |
| 2010/0321253 A1 * | 12/2010 | Ayala Vazquez | H01Q 1/2258 |
| | | | 343/702 |
| 2013/0008796 A1 | 1/2013 | Silverman et al. | |
| 2013/0009833 A1 | 1/2013 | Kough et al. | |
| 2013/0050032 A1 | 2/2013 | Shiu et al. | |
| 2014/0009355 A1 | 1/2014 | Samardzija et al. | |
| 2014/0076600 A1 | 3/2014 | Browning et al. | |
| 2014/0098502 A1 * | 4/2014 | Lasarov | H04M 1/0283 |
| | | | 361/752 |
| 2014/0266149 A1 * | 9/2014 | Martinez | H04M 1/24 |
| | | | 324/71.1 |
| 2014/0361934 A1 * | 12/2014 | Ely | C23C 14/16 |
| | | | 343/702 |
| 2014/0361945 A1 | 12/2014 | Misra et al. | |
| 2014/0363623 A1 | 12/2014 | Sun et al. | |
| 2015/0038199 A1 * | 2/2015 | Shiraishi | H04M 1/185 |
| | | | 455/575.7 |
| 2015/0050968 A1 * | 2/2015 | Jeon | C25D 5/48 |
| | | | 455/575.1 |
| 2015/0092371 A1 * | 4/2015 | Meinhold | H05K 1/03 |
| | | | 361/767 |
| 2016/0006108 A1 * | 1/2016 | Kato | H01Q 1/2216 |
| | | | 343/702 |
| 2016/0028151 A1 * | 1/2016 | Tsai | B21D 5/00 |
| | | | 343/702 |
| 2016/0044800 A1 * | 2/2016 | Jarvis | H01R 43/205 |
| | | | 361/759 |
| 2016/0072932 A1 * | 3/2016 | Hill | H04M 1/0249 |
| | | | 455/575.1 |
| 2016/0116948 A1 * | 4/2016 | Ou | G06F 1/1698 |
| | | | 361/679.56 |
| 2016/0120046 A1 * | 4/2016 | Ou | H01Q 9/04 |
| | | | 343/702 |
| 2016/0134321 A1 * | 5/2016 | Yan | H04B 1/3888 |
| | | | 455/575.1 |
| 2016/0149298 A1 * | 5/2016 | Ely | C23C 14/16 |
| | | | 343/872 |
| 2016/0192517 A1 * | 6/2016 | Tsao | H05K 13/00 |
| | | | 361/679.01 |
| 2016/0269513 A1 * | 9/2016 | Hiroki | H04M 1/0202 |
| 2016/0380337 A1 * | 12/2016 | Lee | H01Q 1/243 |
| | | | 343/702 |

OTHER PUBLICATIONS

Chinese Patent for Utility Model No. ZL201620286475.6—Utility Model Patentability Evaluation Report (UMPER) dated Mar. 7, 2017.

* cited by examiner

METHODS FOR ELECTRICALLY ISOLATING AREAS OF A METAL BODY

CROSS REFERENCE TO RELATED APPLICATIONS

This application claims the benefit of priority under 35 U.S.C § 119(e) to U.S. Provisional Application No. 62/146,155, entitled "METHODS FOR ELECTRICALLY ISOLATING AREAS OF A METAL BODY," filed on Apr. 10, 2015, the disclosure of which is incorporated herein by reference in its entirety.

FIELD

The described embodiments relate generally to methods of forming unitary structures by rendering portions of a metal substrate non-conductive, thereby creating conductive regions that are electrically isolated from each other. The methods can be use in various applications, including forming electrically isolated portions of electronic devices, such as enclosures and housing for electronic devices.

BACKGROUND

Many computing devices have outer enclosures and coverings with metallic surfaces that give the device enclosures an aesthetically pleasing look and feel, as well as a high durability. Computing devices also generally include any of a number of complex functional components. For example, many mobile phones, tablets and laptops have radio frequency antennas that allow communication via radio frequency transmission.

One design challenge associated with computing devices is maintaining a sleek and consistent appearance of a metallic enclosure for housing the various complex internal components. Since metal is not radio frequency transmissive, metal is generally a poor choice of material when the devices utilize radio frequency transmission for communication. In addition, metal is generally a high capacitive material, and as a result, not used to cover capacitive touch pads, touch screens and other capacitive sensors. Accordingly, portions of the enclosures that cover antennas and touch sensors are typically made of a non-metallic material such as plastic or glass. Unfortunately, plastic surfaces and glass surfaces can have different visual and tactile qualities than metallic surfaces, which can result in a visible and tactile break in the metallic surface of the enclosures. These visible breaks can detract from the smooth and continuous look of the metallic enclosures.

SUMMARY

This paper describes various embodiments that relate to forming metallic structures having electrically isolated portions that are separated by non-conductive portions. In particular embodiments, oxidation techniques are used to form metal oxide portions within a bulk metal substrate.

An enclosure for an electronic device is described. The enclosure includes a unitary structure. The unitary structure includes a substrate formed of a metal and having a first portion electrically isolated from a second portion by an insulating portion formed of the metal having been rendered electrically insulative.

According to another embodiment, an enclosure for an electronic device is described. The enclosure includes a substrate defined by a thickness. The substrate has a first metal portion, a second metal portion and an intervening portion positioned between the first and second metal portions. An entirety of the thickness of the substrate at the intervening portion is comprised of metal oxide material such that the first metal portion is electrically separated from the second metal portion.

According to another embodiment, a method of oxidizing a metal substrate is described. The method includes masking a first portion and a second portion of the metal substrate with a mask such that an intervening portion between the first portion and the second portion is unmasked. The method also includes immersing the metal substrate in an electrolytic solution. The method further includes applying an electric potential to the metal substrate while immersed in the electrolytic solution. The electric potential is sufficiently high to cause electrical discharge and formation of an associated plasma that converts the intervening portion of the metal substrate to a metal oxide material. An entire thickness of the metal substrate at the intervening portion is converted to the metal oxide material such that the first portion is electrically separated from the second portion.

According to a further embodiment, a substrate characterized has having a thickness is described. The substrate includes a first metal portion, a second metal portion and an intervening portion positioned between the first and second metal portions. The intervening portion is characterized as being non-electrically conductive. An entirety of the thickness of the substrate at the intervening portion is comprised of metal oxide material such that the first metal portion is electrically separated from the second metal portion.

These and other embodiments will be described in detail below.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1A:
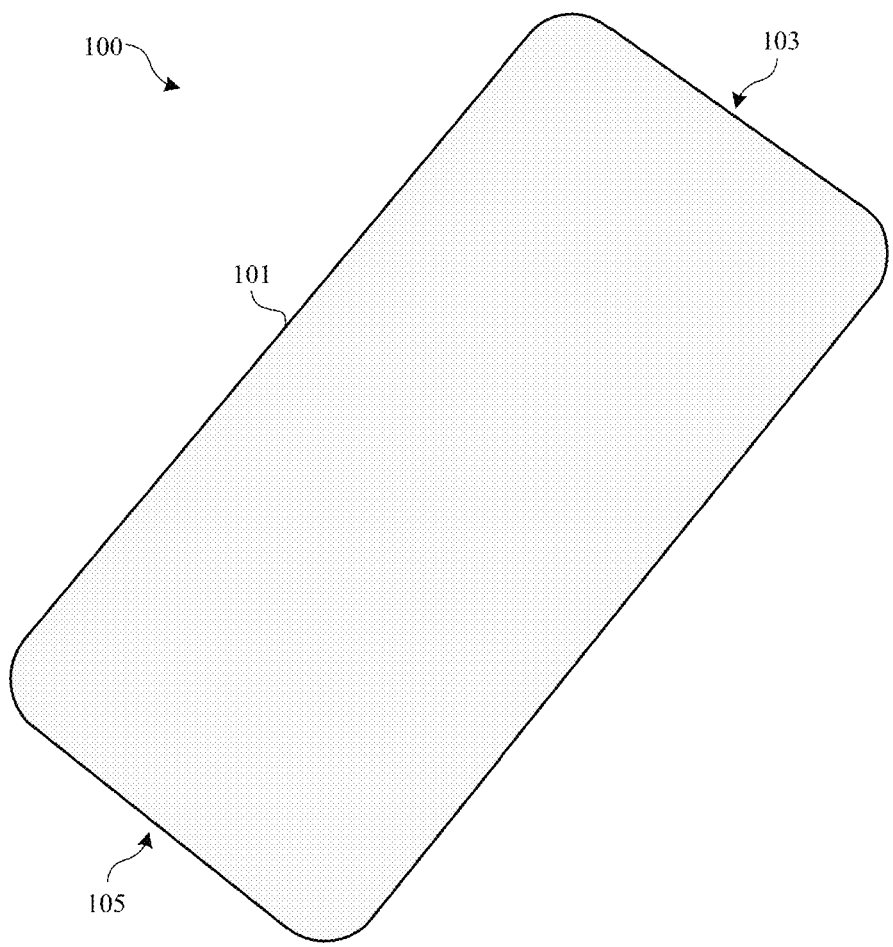
FIGS. 1A-1C show a back view of an enclosure of an electronic device that can be formed using methods described herein.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to forming a non-electrically conductive portion within a metal substrate such that electrically isolated conductive portions are formed within a unitary structure. In some embodiments, the unitary structures are formed by co-extruding and/or molding a non-electrically conductive material with an electrically conductive material. In some embodiments, the non-electrically conductive portions are metal oxide portions formed by oxidizing select portions of a metal substrate. In some cases, the non-electrically conductive portions are radio frequency (RF) transmissive or transparent, meaning they allow RF waves to pass though substantially uninterrupted. In some applications, the unitary structures are used to form enclosures for electronic devices that include RF antennas. The non-electrically conductive portions of the enclosure can allow RF communication to and/or from the RF antennas housed within the enclosures.

In embodiments where the non-electrically conductive portions are made of metal oxide, the metal oxide material can be formed using any suitable technique. In some embodiments, the metal oxide is formed using one or more anodizing processes. In general, anodizing is an electrolytic process that involves converting a portion of a metal substrate, typically a top layer of the metal substrate, to a corresponding metal oxide layer. The anodizing methods described herein can be adapted to anodize select portions of a metal substrate through an entire thickness of the metal substrate instead of only providing a top coating to the metal substrate. This way, adjacent metal portions can become electrically isolated from one another. In some embodiments the oxidizing process involves plasma electrolytic oxidation (PEO) techniques. Like anodizing, PEO is an electrochemical process. However, PEO usually involves applying higher potentials to a metal substrate compared to conventional anodizing processes. The high potential causes discharged to occur, which results in the formation of plasma that oxidizes the metal substrate to a corresponding metal oxide. This generally allows for formation of metal oxide with greater thicknesses compared to metal oxides using anodizing. In some embodiments, an anodizing and a PEO process are used in combination.

In some embodiments, portions of the metal substrates are masked prior to exposure to an oxidizing process (e.g., anodizing or PEO). The portions of the metal substrate that are not masked are oxidized and converted to corresponding metal oxide material, while the masked portions remain in metal form. The unmasked portion of the metal substrate can be oxidized through an entire thickness of the substrate, thereby electrically separating the metal portions. In some PEO embodiments, the plasma is concentrated at certain regions of the substrate such that specified portions of the metal substrate are oxidized. This can be done in addition to or instead of masking the substrate.

Methods described herein are well suited for providing cosmetically appealing and/or functional portions of consumer products. For example, the methods described herein can be used to form metal enclosures or portions of metal enclosures for electronic devices, such as computers, portable electronic devices, wearable electronic devices and electronic device accessories, such as those manufactured by Apple Inc., based in Cupertino, Calif.

These and other embodiments are discussed below with reference to FIGS. 1A-10. However, those skilled in the art will readily appreciate that the detailed description given herein with respect to these Figures is for explanatory purposes only and should not be construed as limiting.

Methods described herein can be used to form metal structures having electrically isolated metal portions separated from each other by intervening non-metal portion. In some embodiments, the non-metal portions are made of metal oxide, which is substantially non-electrically conductive. Note that as used herein, the terms "oxide," and "metal oxide," "metal oxide material," and "oxide material" can be used interchangeably. The metal structures can serve as cosmetic and/or functional members for any of a number of suitable applications.

In some applications, the metal structures serve as housings or enclosures of electronic devices. For example, FIG. 1A shows a back view of enclosure 101 of an electronic device 100, such as a mobile phone, prior to treatment in accordance with some methods described herein. Enclosure 101 can be made of any suitable electrically conductive material, such as metal. In some embodiments, enclosure 101 is made of a metal material, such as aluminum or aluminum alloy, that can be oxidized to form a durable metal oxide. Electronic device 100 can include one or more RF antennas (not shown) positioned within enclosure 101 and configured to transmit and/or receive RF signals. For example, RF antennas may be positioned proximate to ends 103 and 105 of electronic device 100. In some embodiments, enclosure 101 is anodized such that a protective and cosmetically appealing metal oxide layer is formed on exposed surfaces of enclosure 101.

Figure 1B:
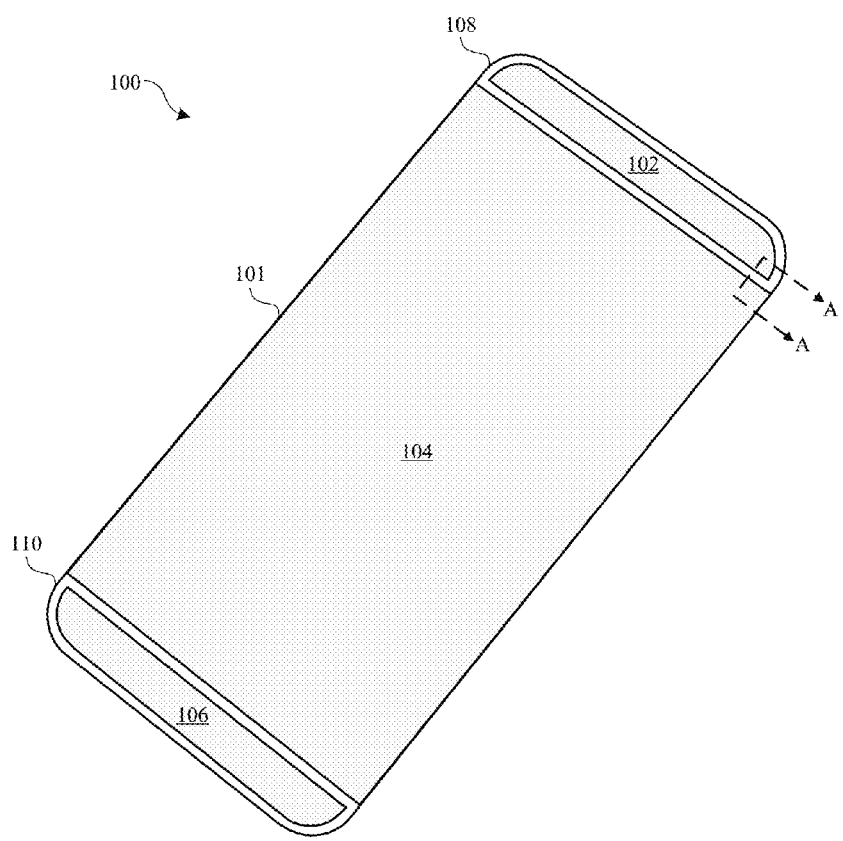
Figure 1C:
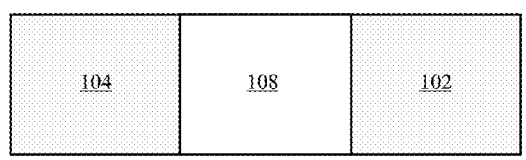

FIGS. 1B and 1C show enclosure 101 after portions of enclosure 101 are electrically separated. FIG. 1B shows a back view and FIG. 1C shows cross section A-A view of enclosure 101. As shown, electrically conductive or metal portions 102, 104 and 106 are separated from one another by non-electrically conductive or non-metal portions 108 and 110. Non-metal portions 108 and 110 can also be referred to as an electrically insulating portion. Non-metal portions 108 and 110 can be RF transparent in order to allow transmission of RF signals to and/or from antenna(s) housed within enclosure 101. In this way, non-metal portions 108 and 110 can sometimes be referred to as RF windows, segments or lines. RF transparent materials can be non-conductive materials such as glass, plastic or ceramic (e.g. metal oxide). Methods described herein can be used to form non-metal portions 108 and 110 that are unitarily formed with metal portions 102, 104 and 106. For example, non-metal portions 108 and 110 can co-extruded with metal portions 102, 104 and 106 using an extruding process. In some embodiments, non-metal portions 108 and 110 and metal portions 102, 104 and 106 are molded together using a molding process. In some embodiments, a co-extrusion and molding operation are used in combination. The co-extruding and/or molding process can be customized such that any seams between non-metal portions 108 and 110 and metal portions 102, 104 and 106 are visually and tactilely unperceivable to a user of electronic device 100. For example, enclosure 101 can be finished after the co-extrusion and/or molding process to smooth out thickness variations of non-metal portions 108 and 110 and metal portions 102, 104 and 106.

In some embodiments, non-metal portions 108 and 110 are formed by converting selected portions of enclosure 101 to a corresponding metal oxide using an oxidizing process, such as anodizing or PEO. Metal oxide is generally non-conductive and sufficiently RF transparent to allow RF signals to pass therethrough, and therefore can be used as a suitable RF window or segment material for device 100. Since the oxidizing process is a conversion process, non-metal portions 108 and 110 can be integrally formed with metal portions 102, 104 and 106 such that transitions between non-metal portions 108 and 110 and metal portions 102, 104 and 106 are virtually seamless. This can improve the look and feel of enclosure 101. In addition, the manufacturing process for forming enclosure 101 can be simplified since enclosure 101 can be formed from a single metal piece instead of three separate pieces. That is, conventional methods for forming enclosure 101 can include forming metal portions 102, 104 and 106, then coupling metal portions 102, 104 and 106 together with non-metal portions 108 and 110. In contrast, the oxidizing processes can involve starting with a single metal substrate, and oxidizing portions of enclosure 101 without cutting metal portions 102, 104 and 106 into individual pieces. This can also eliminate problems related to mismatched looking metal portions 102, 104 and 106.

Note that the shapes of RF transparent non-metal portions 108 and 110 and metal portions 102, 104 and 106 are not limited to those shown in FIGS. 1A-1C. That is, the shapes of non-metal portions 108 and 110 and metal portions 102, 104 and 106 can vary depending on design requirements. For example, non-metal portions 108 and 110 can encompass portions 102 and 106 such that portions 102 and 106 are non-conductive and/or RF transparent.

Figure 2:
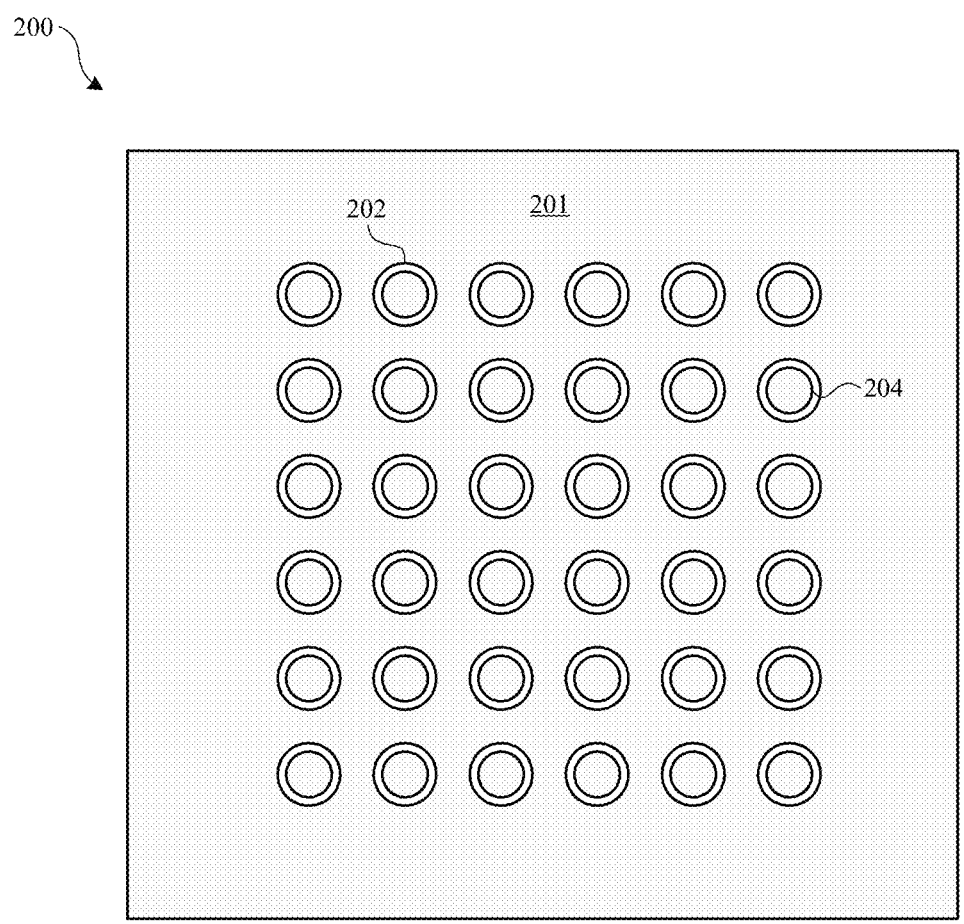
FIG. 2 shows a structure that can be formed using methods described herein.

The methods described herein can also be used to form other types of metal structures. For example, the methods described herein can be used to form an arrangement of metal portions isolated from each other by metal oxide. FIG. 2 shows part or structure 200 that can be formed using methods described herein. Structure 200 can be part of an electronic component of a larger electronic device. Structure 200 includes metal substrate 201, which can correspond to a metal material that can form a durable oxide, such as aluminum or aluminum alloy. In some embodiments, metal substrate 201 is treated such that portions 202 are oxidized to a corresponding non-electrically conductive metal oxide material. Non-conductive portions 202 can be formed through an entire thickness of metal substrate 201, and can surround metal portions 204 such that metal portions 204 are electrically isolated from one another. Metal portions 204 can be arranged in a predetermined pattern, such as an array or grid. For example, metal portions 204 can be arranged in accordance with a sensor array with each metal portion 204 corresponding to a position of a sensor. Non-conductive portions 202 electrically isolate each metal portion 204 such that the sensor array can function independently. In some embodiments, metal portions 204 can function as button sensors. The shapes, sizes and spacings between metal portions 204 can vary depending on design choice.

Note that FIGS. 1A-1C and 2 are provided as exemplary implementations of the techniques described herein and are not meant to limit the scope of possible applications and types of unitary structures that can be formed using the techniques described herein. For example, metal oxide portions of a substrate having larger areas can be used to cover capacitive touch pads, touch screens or other capacitive sensors of an electronic device.

Figure 3A:
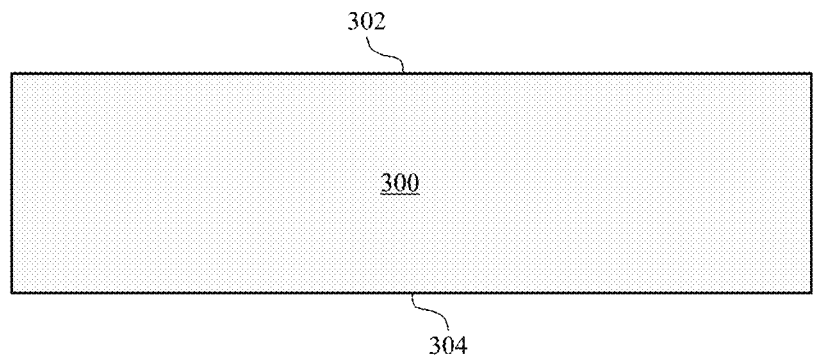
FIGS. 3A-3D show cross section views of a portion of a substrate undergoing an oxidation process in accordance with some embodiments.
Figure 3B:
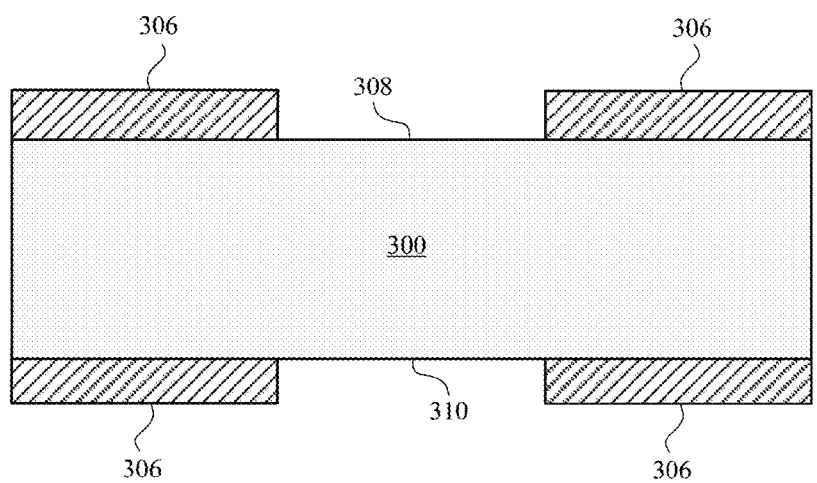

FIGS. 3A-3D show close up cross section views of a portion of substrate 300 undergoing an oxidation process in accordance with some embodiments. FIG. 3A shows substrate 300, which can be made of an electrically conductive material, such as metal. In some embodiments, substrate 300 is made of aluminum or aluminum alloy. Substrate 300 includes first side 302 and opposing second side 304. At FIG. 3B, select portions of substrate 300 are covered with mask 306. In the embodiment of FIG. 3B select portions of first side 302 and second side 304 of substrate 300 are covered with mask 306, which leaves portions 308 and 310 exposed. In other embodiments, one side (e.g., first side 302 or second side 304) is completely masked. Mask 306 can be made of any suitable type of material that can protect the selected portions of substrate 300 covered by mask 306 from oxidizing in a subsequent oxidizing process. In some embodiments, mask 306 is made of polymer material. Mask 306 can be applied to substrate 300 using any suitable technique, including painting on, spraying on, spinning on, taping/gluing on using adhesive, or using heat-shrink methods.

Figure 3C:
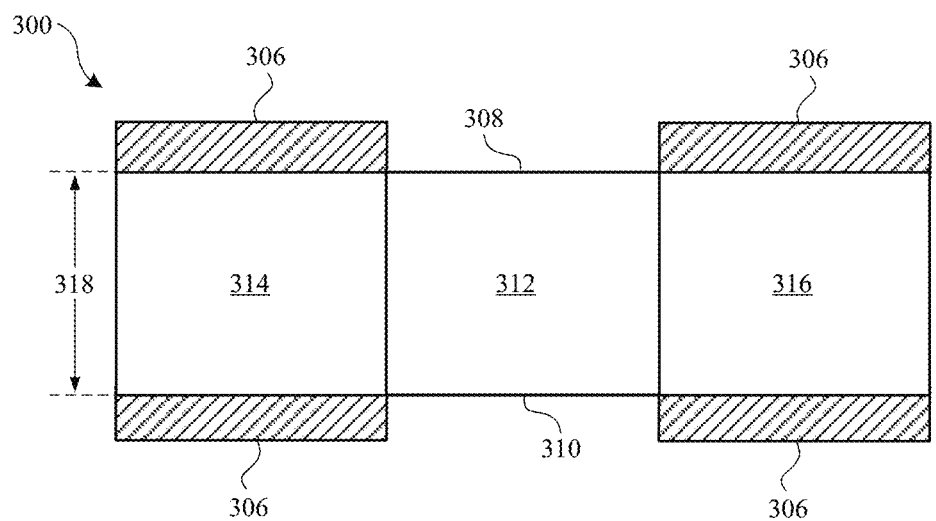

At FIG. 3C, exposed portions 308 and 310 are oxidized and converted to a corresponding metal oxide 312. Mask 306 prevents metal portions 314 and 316 from being oxidized and, therefore, remain in metal form. The oxidizing process can convert an entire thickness 318 of substrate 300 to metal oxide 312, thereby electrically separating metal portions 314 and 316. In some embodiments, the oxidizing process is an anodizing process. This involves immersing substrate 300 in an electrolytic solution and applying a voltage such that substrate 300 acts as an anode to a counter electrode. This causes conversion of metal material of substrate 300 on first side 308 and second side 310. Note that in embodiments where one side (e.g., first side 308 or second side 310) is completely masked, the oxidizing will occur from one side only. In some embodiments, the process can modified to provide a sufficiently thick metal oxide 312 to embody the entire thickness 318. For example, thickness 318 of substrate 300 can be made to be sufficiently thin to allow complete conversion using anodizing. Additionally, the anodizing process parameters (e.g., type of electrolyte, voltage and/or current density) can be adjusted to create a thick oxide.

In some embodiments, a PEO process is used instead of or in addition to an anodizing process. As described above, PEO techniques can form metal oxides having greater thickness compared to conventional anodizing processes. Like anodizing, PEO is an electrolytic process. However, PEO generally uses higher voltages compared to anodizing, thereby allowing more of substrate to be converted to its corresponding metal oxide. Details of some PEO techniques are described in detail further below.

Figure 3D:
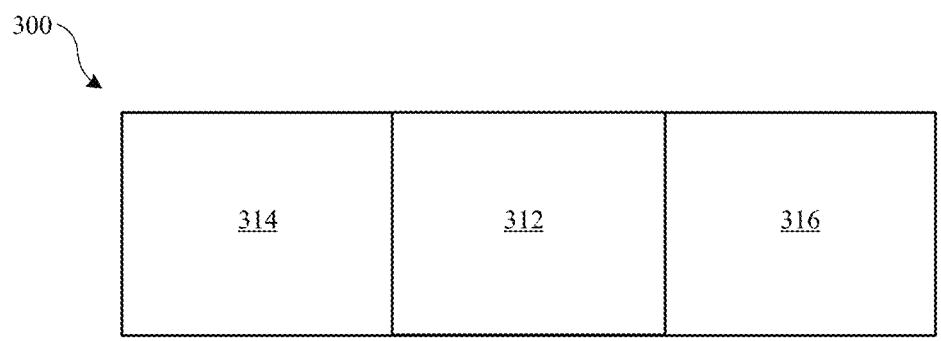

At FIG. 3D, mask 306 is removed. Metal oxide portion 312 can not only be electrically non-conductive but can also be RF transparent. Therefore metal oxide portion 312 can act as an RF window or segment of a larger structure or part, such as an enclosure for an electronic device, as described above.

In some embodiments, the metal oxide portions of the metal structures are formed using plasma electrolytic oxidation (PEO). PEO is an electrochemical process that involves creating plasma that oxidizes metal material of a metal substrate to a corresponding metal oxide. PEO is similar to anodizing in that a metal substrate is electrochemically oxidized. However, PEO generally uses higher electrical potentials compared to anodizing so that discharges occur, resulting in formation of plasma that oxidizes the metal substrate. The higher potentials of PEO processes generally allow for growth of greater thickness of metal oxide compared to anodizing processes. For example, PEO processes can be used to grow metal oxides having a thickness of tens or hundreds of micrometers or more, compared to anodizing which generally grows metal oxides with thicknesses of tens of micrometers or less.

Figure 4A:
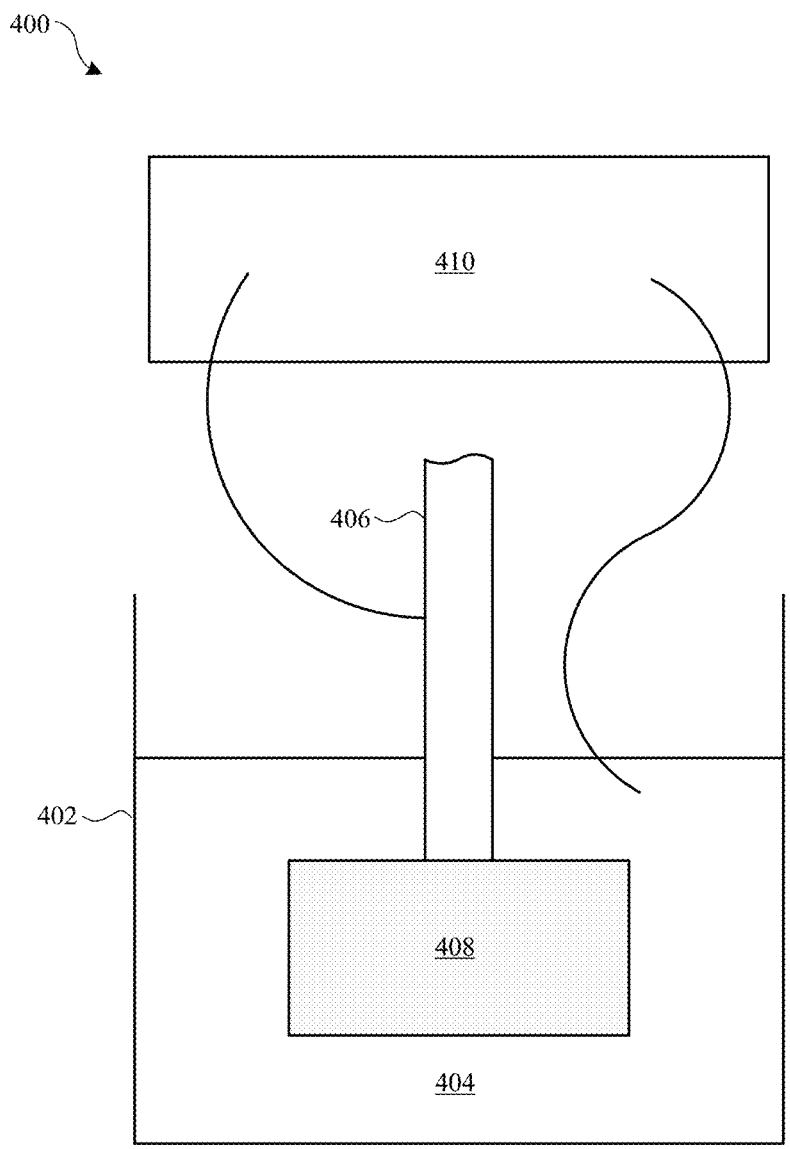
FIGS. 4A and 4B show an apparatus that can be used to perform a PEO process, in accordance with some embodiments.

FIG. 4A shows apparatus 400 used to perform a PEO process in accordance with some embodiments. Apparatus 400 includes tank 402 configured to hold an electrolytic bath or solution 404, such as an alkaline solution. Fixture 406 is configured to hold substrate 408 while substrate 408 is immersed in electrolytic solution 404. Power supply 410 provides electric current to substrate 408, i.e., via fixture 406 and to electrolytic solution 404. Substrate 408 can be made of any suitable anodizable material, such as aluminum, titanium and/or alloys thereof. Substrate 408 acts as an electrode and the walls of tank 402, which can be made of an inert material such as stainless steel, can act as a counter electrode. During the PEO process, the outer surface of substrate 408 is converted to a corresponding layer of metal oxide. For example, aluminum and aluminum alloys are converted to aluminum oxide.

Power supply 410 generally provides a relatively high potential, such as 200 V or greater, such that discharges occur. These discharges result in localized plasma reactions that oxidize and cause conversion of some of the metal to a corresponding metal oxide. The metal oxide layer has different properties than the base metal of substrate 408. For example, metal oxides are generally harder than its corresponding metal. In addition, metal oxides generally have good corrosion and wear resistance, and are non-electrically conductive. In some cases, the resulting metal oxide is in crystalline form and can therefore be harder than metal oxides formed using anodizing methods. The resultant metal oxide layer can generally be grown to a greater thickness than those grown using anodizing methods. For example, a metal oxide layer having a thickness of ten or hundreds of micrometers can be grown. In some cases, a metal oxide layer having a thickness of about 1 millimeter can be achieved.

Figure 4B:
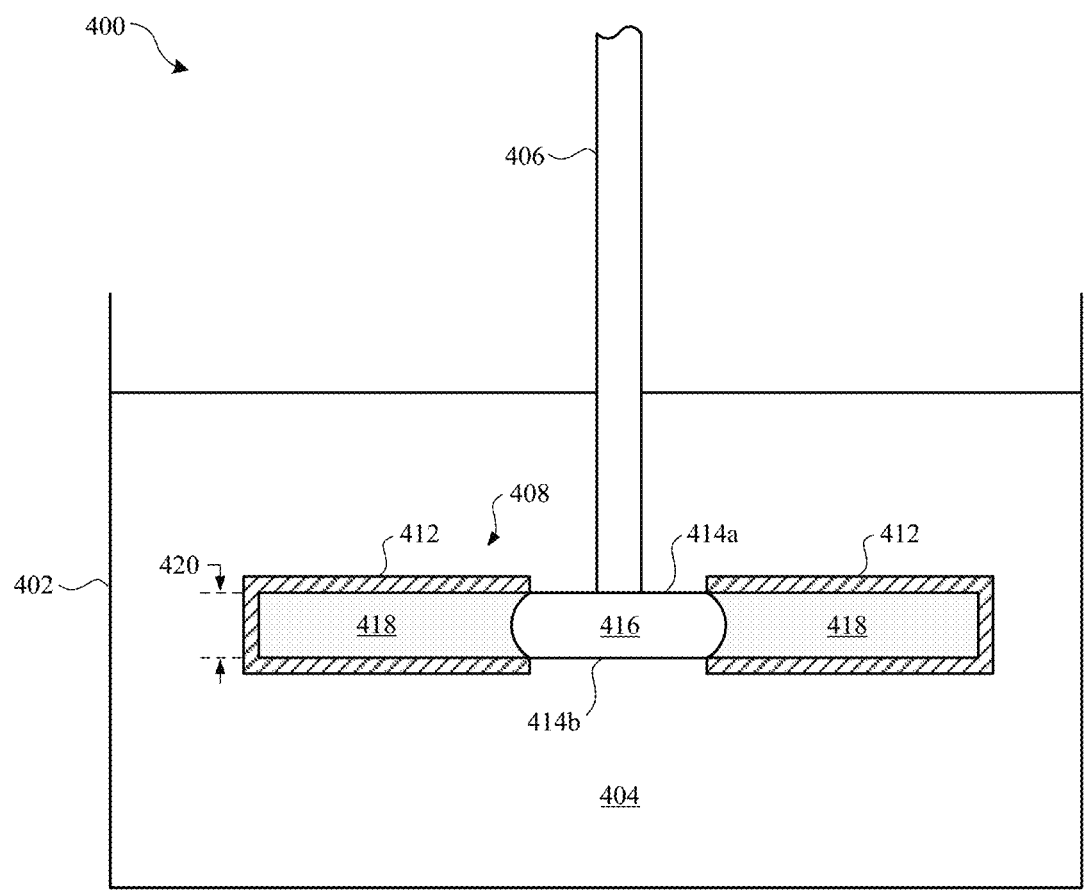

Typical PEO processes involve forming a metal oxide layer on a metal substrate. In contrast, methods described herein can involve oxidizing entirely through, or nearly entirely through, a thickness of a metal substrate. In addition, selected portions of the metal substrate can be oxidized as opposed to an entire surface of a metal substrate. FIG. 4B shows apparatus 400 adapted to form metal oxides in accordance with some embodiments. For simplicity, power supply 410 is not shown. Fixture 406 holds substrate 408 within electrolytic solution 404 and can be electrically grounded. Select portions of substrate 408 are covered with mask 412, which is generally a non-conductive material that is resistant to substantial degradation during the PEO process. In some embodiments, mask 412 is made of a polymer material. Mask 412 can be applied onto substrate 408 using any suitable technique, such as painting on, spraying on, spinning on, taping/gluing on using adhesive, or applied using heat-shrink methods.

Mask 412 is applied to all surfaces of substrate 408 except for first surface 414a and opposing second surface 414b of substrate 408, which are exposed to electrolytic solution 404, and the portion of substrate 408 attached to fixture 406. During a PEO process, when the power supply is turned on, a potential is created between electrolytic solution 404 and substrate 408. Exposed first and second surfaces 414a and 414b of substrate 408 undergo oxidation and are converted to corresponding metal oxide portion 416. For example, substrate 408 made of aluminum or aluminum alloy will be converted to an aluminum oxide material. Portions 418 of substrate 408 covered by mask 412 do not undergo the oxidation process and therefore remain in metal form. The oxidation process is an inward growing process in that metal oxide material grows inward from opposing surfaces 414a and 414b of substrate 408.

The growth of metal oxide material at metal oxide portion 416 can be controlled by adjusting the applied voltage and/or current density, as well as the time period of performing the PEO process. The thickness of metal oxide portion 416 can also depend, in part, on the geometry of the substrate. In some embodiments, the PEO process is performed such that substantially the entire thickness 420 of substrate 408 corresponding to metal oxide portion 416 is converted to metal oxide material. This can be achieved because the PEO process enables relatively large areas of metal to be converted to metal oxide, in some cases up to about 1 millimeter or more. One can determine when metal oxide portion 416 is fully converted by measuring the current density flowing from fixture 406 during the PEO process. In particular, metal oxide portion 416 is generally fully converted when the current density measured at fixture 406 reaches zero or near zero.

In some embodiments, the thickness 420 of substrate 408 is made sufficiently thin to allow for full conversion to metal oxide material. For example, in some embodiments substrate 408 has a thickness 420 of about 0.3 millimeters or less. In other embodiments, thickness 420 can be greater than 0.3 millimeters. In these embodiments where metal oxide portion 416 is fully converted, substrate 408 includes conductive and RF opaque metal portions 418 that are separated by non-conductive and RF transparent metal oxide portion 416. In addition to having different electrically conductive and RF transparency properties, metal oxide portion 416 has different mechanical properties than metal portions 418, such as greater hardness and corrosion/wear resistance. Furthermore, metal oxide portion 416 may have a different appearance than metal portions 418 since metal oxide material can have a translucent quality. However, in some embodiments, metal oxide portion 416 is altered to appear less translucent and more like metal portions 418, which will be described in more detail below. After the PEO process is complete, substrate 408 can undergo one or more post-PEO processes, such as machining and surface finishing operations, to create a final part.

Note that apparatus 400 shown in FIGS. 4A and 4B are exemplary and other suitable PEO arrangements can be used in order to selectively oxidize areas of a substrate. For example, in addition to or instead of masking portions of a substrate, the PEO apparatus 400 can be arranged to concentrate the plasma in certain regions of the substrate, such as by placing electrically conductive items proximate to specified surfaces of substrate 408.

Figure 5:
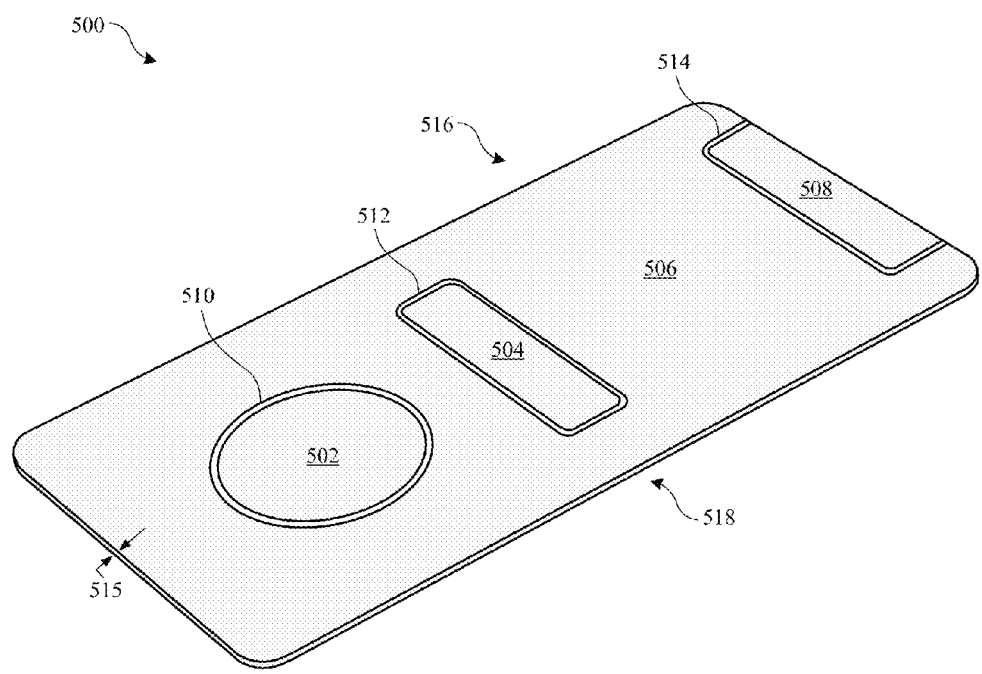
FIG. 5 shows a perspective view of a substrate after undergoing an oxidizing process, in accordance with some embodiments.

FIG. 5 shows a perspective view of substrate 500 after undergoing an oxidizing process in accordance with some embodiments. Substrate 500 can be part of an enclosure for an electronic device, such as a mobile telephone. Substrate 500 includes metal portions 502, 504, 506, 508 separated by intervening metal oxide portions 510, 512, 514. If metal oxide portions 510, 512, 514 are formed through an entire thickness 515 of substrate 500, metal portions 502, 504, 506, 508 will be electrically isolated from each other. In addition, metal oxide portions 510, 512, 514 can be electrically non-conductive and RF transparent. Thus, in some embodiments, metal oxide portions 510, 512, 514 can serve as RF windows or RF transparent segments/lines. Since metal portions 502, 504, 506, 508 can be electrically isolated from one another, different electrical components can be electrically connected with each of metal portions 502, 504, 506, 508 without themselves being electrically connected. For example, an electrical component can be electrically grounded with metal portion 502 without being electrically connected metal portions 504, 506 and 508.

Metal oxide portions 510, 512, 514 that are formed all the way through thickness 515 of substrate 500 can be accomplished a number of ways. In one embodiment, surfaces of substrate 500 corresponding to metal portions 502, 504, 506, 508 are masked, including surfaces on first side 516 and opposing second side 518, which is not visible in the view of FIG. 5. Substrate 500 is then exposed to an oxidizing process such that portions of substrate 500 are converted to metal oxide portions 510, 512, 514. For anodizing and PEO processes, substrate 500 is immersed in an electrolytic solution. When voltage is applied, metal oxide material grows inward from both first side 516 and second side 518 until metal oxide portions 510, 512, 514 are fully converted. This is similar to what is described above with reference to FIG. 4B. In other embodiments, surfaces of substrate 500 corresponding to metal portions 502, 504, 506, 508 are masked at first side 516 while the entirety of second side 518 is masked. This way, when substrate 500 is immersed in the electrolytic solution, only portions of substrate at first side 516 are exposed to the oxidizing process. This causes metal oxide material to grow inward from only first side 516 and not from second side 518. After the oxidizing process is complete, any non-converted metal material on second side 518 can be machined or abraded off of substrate 500 such that metal oxide portions 510, 512, 514 are formed all the way through thickness 515.

As described above, metal oxide material can have a different appearance than metal. In particular, metal oxide material can have a more translucent quality compared to metal. In some applications, however, it is desirable for intervening metal oxide portions 510, 512, 514 to appear similar to metal portions 502, 504, 506, 508. Thus, in some embodiments, metal oxide portions 510, 512, 514 can be dyed or colorized to appear similar in color to metal portions 502, 504, 506, 508. Alternatively or additionally, substrate 500 can undergo one or more pre-oxidizing processes in order to achieve metal oxide portions 510, 512, 514 with similar coloration as metal portions 502, 504, 506, 508.

Figure 6A:
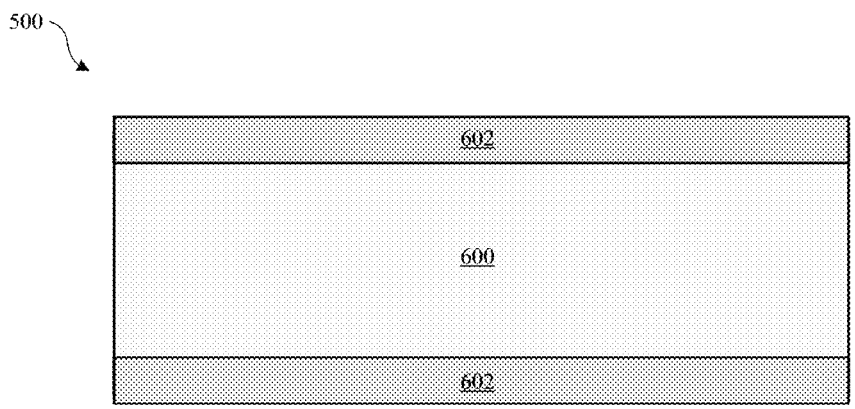
FIGS. 6A-6D show cross section views of a portion of a substrate undergoing pre-oxidizing and oxidizing processes to achieve metal oxide portions that look similar to metal portions of the substrate, in accordance with some embodiments.

FIGS. 6A-6D show close-up cross section views of substrate 500 undergoing pre-oxidizing and oxidizing processes to achieve metal oxide portions 510, 512, 514 that look similar to metal portions 502, 504, 506, 508, in accordance with some embodiments. FIG. 6A shows substrate 500 after a pre-oxidizing process is performed. In particular, substrate 500 is anodized such that exposed surfaces of metal 600 are converted to anodized layers 602. Any suitable anodizing process can be used. In some embodiments, an anodizing process known in the art as a type II anodizing process is used, which generally results in anodized layers 602 having acceptable corrosion/wear resistance and cosmetic qualities for many consumer product applications. The thicknesses of anodized layers 602 can vary depending on application requirements. In some embodiments, anodized layers 602 are each in tens of micrometers in thickness or less. Anodized layers 602 can be dyed to give anodized layers 602 a pre-determined color. In some embodiments, anodic pores of anodized layers 602 are filled with dye or other type of colorant in order to impart the pre-determined color to anodized layers 602. In other embodiments, the dyeing process is performed later, such as after a subsequent PEO process is performed.

Figure 6B:
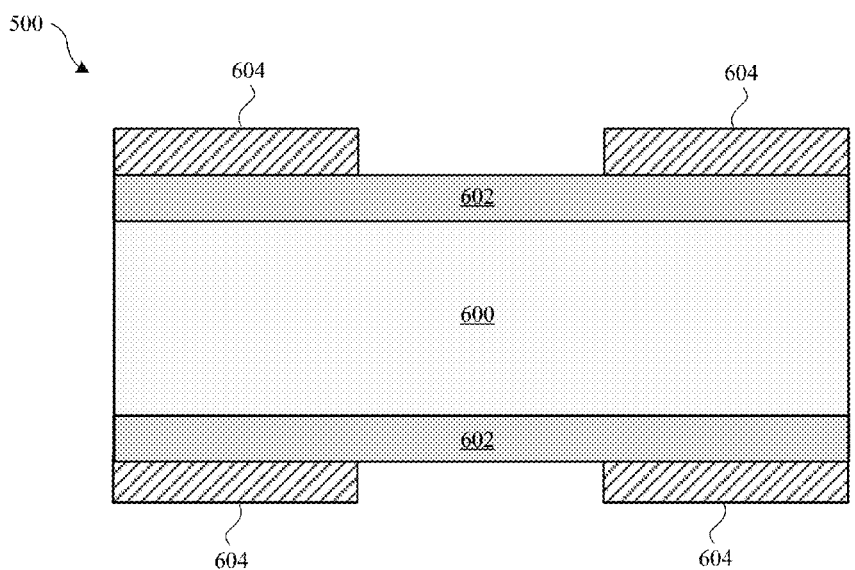
Figure 6C:
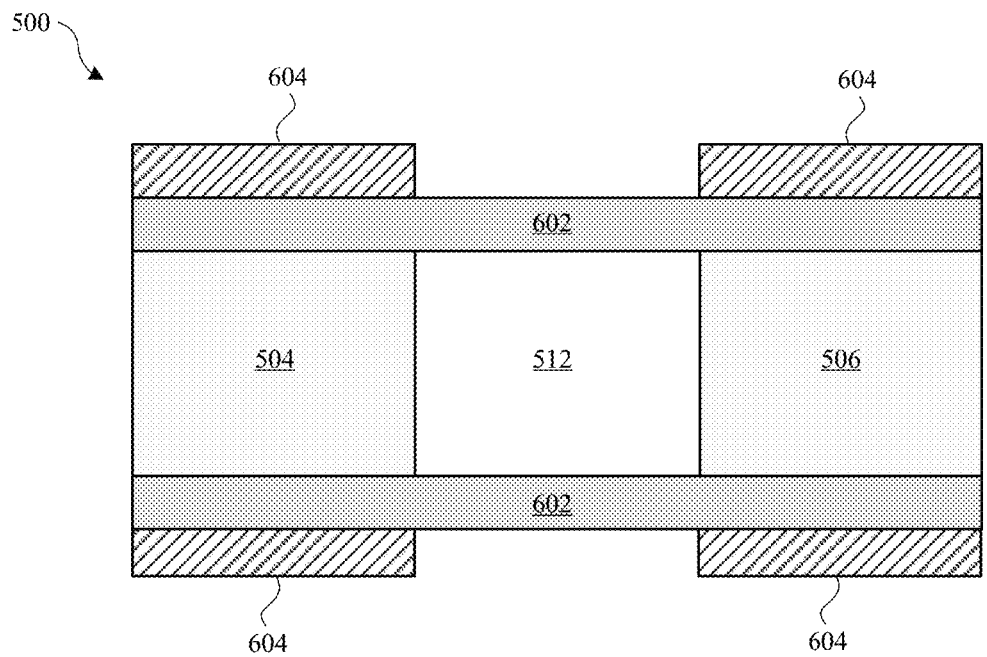

At FIG. 6B, mask 604 is applied to portions of substrate 500 to prevent exposure to a PEO process. As shown, mask 604 can cover surface portions of anodized layers 602. At 6C, substrate 500 is exposed to a PEO process such that metal oxide portion 512 is formed between metal portions 504 and 506. Metal oxide portion 512 can be referred to as a PEO oxide layer to distinguish it from anodized layers 602. The thicknesses of anodized layers 602 can be thin enough such that PEO oxidation occurs through anodized layers 602. Since the PEO process involves conversion of metal material inward, anodized layers 602 remain as exterior layers to metal oxide portion 512 and metal portions 504 and 506. In addition, if anodized layers 602 are dyed, the color imparted to anodized layers 602 by dyeing may also be retained.

Figure 6D:
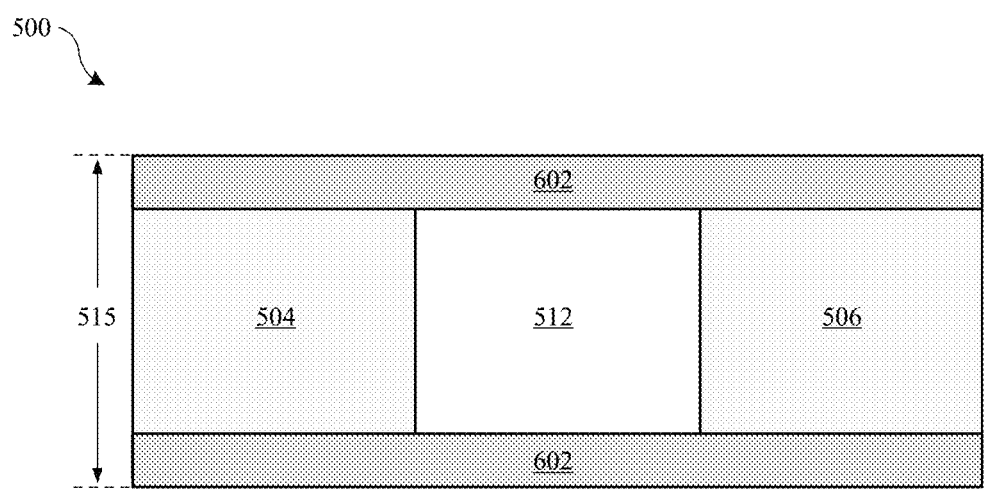

At FIG. 6D, mask 604 is removed from substrate 500. Since metal oxide portion 512 is completely converted to metal oxide material, metal oxide portion 512 is electrically non-conductive. Both sides of metal oxide portion 512 have anodized layer 602, which are also electrically non-conductive. Thus, an entire thickness 515 of substrate 500 corresponding to metal oxide portion 512 is electrically non-conductive, thereby electrically separating metal portions 504 and 506. If anodized layers 602 are dyed, the color imparted to anodized layers 602 can be retained. However, in some case where it may be difficult to retain the dye within anodized layers 602 during the PEO process, a post-PEO dying process can be performed on anodized layers 602. If anodized layers 602 are dyed, substrate 500 can then have a uniformly colored appearance, which may be desirable in some applications.

Figure 7:
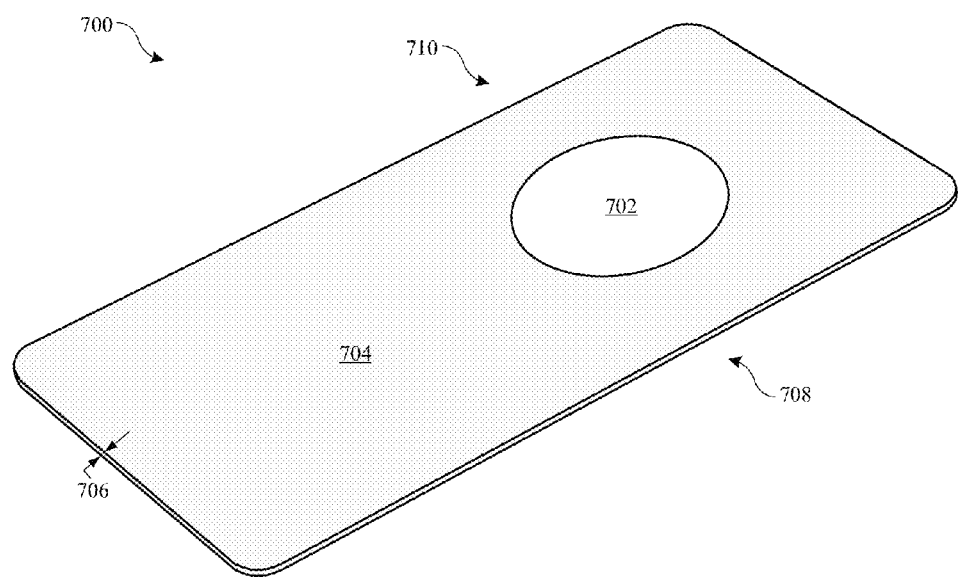
FIG. 7 shows a substrate, which includes a translucent metal oxide portion formed using an oxidizing process, in accordance with some embodiments.

In some embodiments, the translucent quality of metal oxide material is exploited. For example, FIG. 7 shows substrate 700, which includes a translucent metal oxide portion 702 formed using an oxidizing process, in accordance with some embodiments. Metal oxide portion 702 can be formed through an entire thickness 706 of substrate using any suitable oxidizing process described above, such as anodizing, PEO or a combination thereof. For example, metal portion 704 can be masked prior to the oxidizing process such that metal portion 704 remains unconverted to metal oxide material. In some embodiments, outer surfaces of substrate 700 include a thin anodized layer, as described above with reference to FIGS. 5A-5D. Some metal oxide materials can have a translucent quality in that visible light can at least partially shine through. Thus, metal oxide portion 702 can remain undyed so as to retain this naturally translucent quality. In some applications, a light emitter, such as a light emitting diode, is positioned proximate to second side 708 of substrate 700 near translucent metal oxide portion 702. Some of the light emitted from the light emitter can pass through metal oxide portion 702 and be visible from first side 710 of substrate 700. In this way, metal oxide portion 702 can act as a light window. For example, substrate 700 can be a portion of an enclosure for an electronic device, and the light emitter can be positioned within the enclosure. Metal oxide portion 702 can then be a cosmetically appealing lighted design on the enclosure. In some embodiments, metal oxide portion 702 is in the shape of a logo, lettering or other design. In some embodiments, a number of metal oxide portions 702 are formed within substrate 700.

Figure 8A:
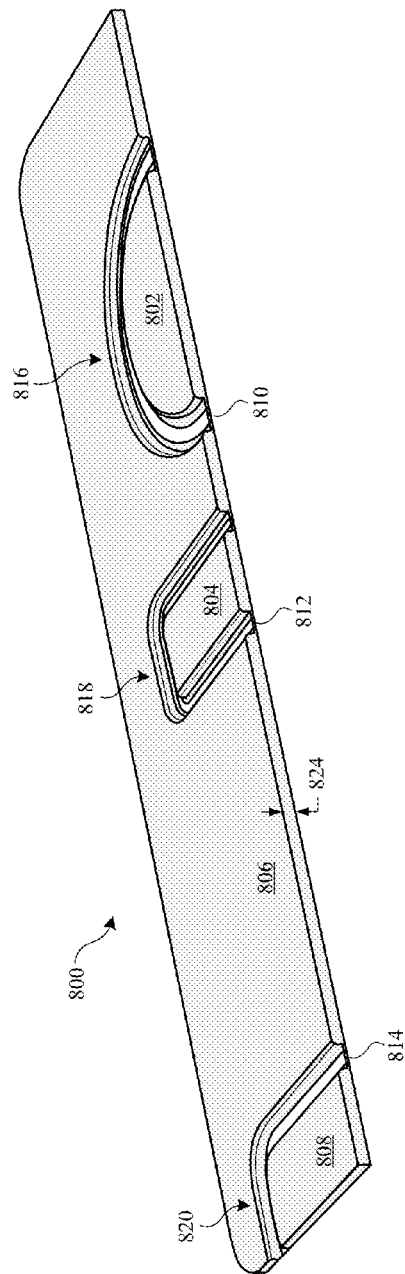
FIGS. 8A-8C show perspective cross section views of portions of a substrate having undergone a pre-oxidizing thinning process, in accordance with some embodiments.
Figure 8C:
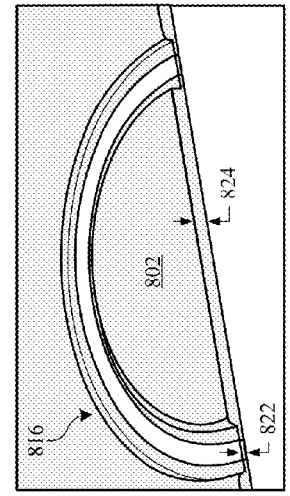
Figure 8B:
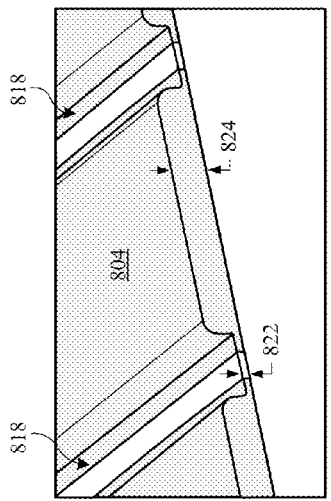

In some cases, it may be advantageous to reduce the thickness of portions of the substrate prior to the oxidizing process. This can assure that the thickness of the substrate is thin enough to accomplish oxidation through an entire thickness of the substrate, while leaving other portions of the substrate thicker for structural and/or other functional purposes. To illustrate, FIGS. 8A-8C show perspective cross section views of portions of substrate 800. Substrate 800 includes metal portions 802, 804, 806, 808, electrically isolated from one another by metal oxide portions 810, 812, 814. As shown, substrate 800 at metal oxide portions 810, 812, 814 is thinner than at metal portions 802, 804, 806, 808. In particular, substrate 800 has a first thickness 822 at metal oxide portions 810, 812, 814 and a second thickness 824 at metal portions 802, 804, 806, 808. In other embodiments, the thicknesses of metal oxide portions 810, 812, 814 vary from one other, and/or the thicknesses of metal portions 802, 804, 806, 808 vary from one another.

Any suitable technique, such as machining and/or etching portions of substrate 800 prior to the oxidizing process can achieve this varied thickness. Specifically, channels 816, 818, 820 are formed within substrate 800 that are in the shape of metal oxide portions 810, 812, 814, respectively. Channels 816, 818, 820 can be formed such thickness 822 of substrate 800 within channels 816, 818, 820 have a pre-determined thickness that is sufficiently thin to provide full oxidation within channels 816, 818, 820 during the oxidizing process. In some embodiments, thickness 822 is about 0.3 millimeters or less. In other embodiments, thickness 822 is greater than 0.3 millimeters. In some embodiments, channels 816, 818, 820 are curved or tapered, as shown in FIGS. 8B and 8C. Thickness 824 of metal portions 802, 804, 806, 808 can vary depending on design choice, such as required for adequate structural integrity of substrate 800.

After channels 816, 818, 820 are formed, metal portions 802, 804, 806, 808 are masked. In some embodiments, portions of surfaces of substrate 800 within channels 816, 818, 820 are also masked. Then, substrate 800 is exposed to an oxidizing process resulting in metal oxide portions 810, 812, 814 that can be formed through entire thickness 822 of substrate 800. The oxidizing process can include an anodizing, PEO or a combination of anodizing and PEO processes, such as described above.

Figure 9:
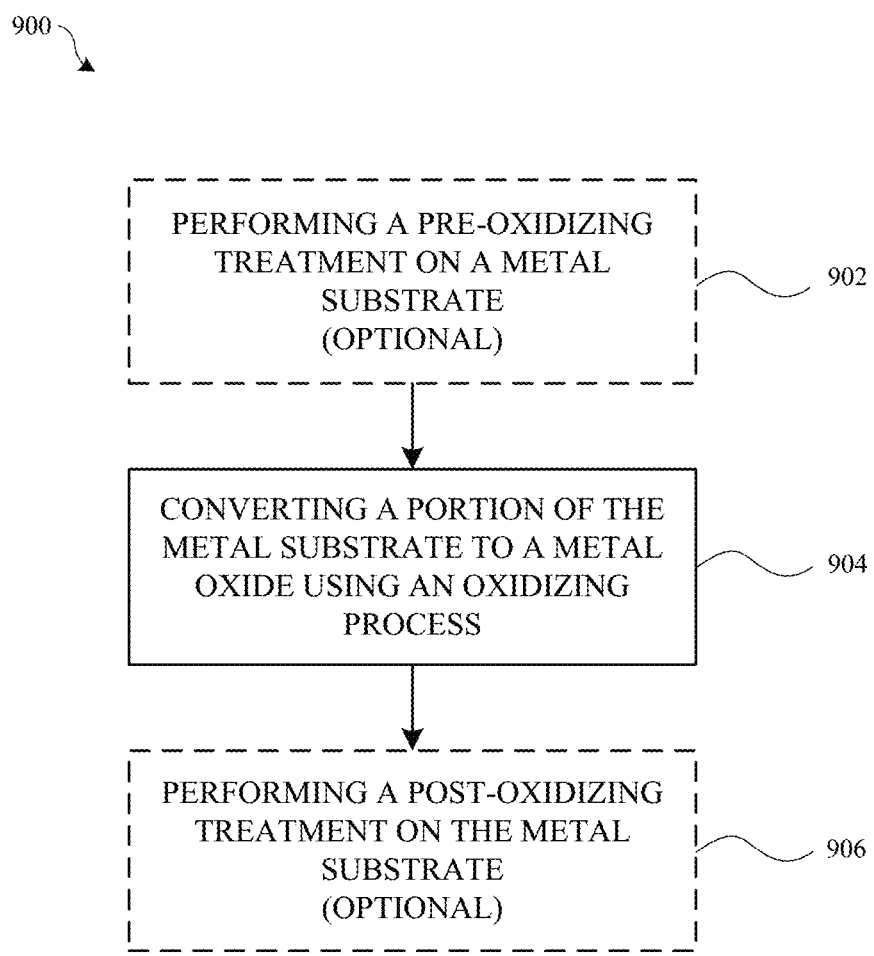
FIG. 9 shows a flowchart indicating an oxidizing process for forming electrically isolated areas within a part, in accordance with some embodiments.

FIG. 9 shows flowchart 900 indicating a process for forming electrically isolated areas within a part using one or more oxidizing processes, in accordance with some embodiments. At 902, one or more pre-oxidizing treatments are optionally performed on a metal substrate. The metal substrate can include any suitable material capable of forming a durable metal oxide, such as aluminum and/or titanium. In some embodiments, machining operations and/or finishing operations are performed to provide a shape to the metal substrate. In some embodiments, portions of the metal substrate are thinned so that the thinned portions can be fully oxidized during a subsequent oxidizing process. For example, channels that are shaped in accordance with shapes of subsequently formed metal oxide portions can be formed within the metal substrate. In some embodiments, portions of the metal substrate to be oxidized are thinned to about 0.3 millimeters or less. In some embodiments, one or more anodizing processes are performed on the metal substrate prior to the oxidizing process to form an outer anodized layer on the metal substrate. The anodized layer can be dyed to a pre-determined color. After surface treatment processes are complete, some surface portions of the metal substrate can be masked using a mask configured to withstand a subsequent oxidizing process. The masked portions of the substrate will correspond to portions of the metal substrate that will remain in metal form, while unmasked portions of the metal substrate will be converted to a corresponding metal oxide during the oxidizing process.

At 904, an oxidizing process is used to convert exposed portions of the metal substrate to a metal oxide portion. If portions of the metal substrate are masked, the unmasked portions are converted to metal oxide while the masked portions remain in metal form. In some embodiments, a PEO process is used since PEO generally allow for greater thicknesses of the metal substrate to be converted to a metal oxide compared to anodizing methods. If exposed portions of the metal substrate are thin enough, the oxidizing process can convert an entire thickness of the exposed portions to a metal oxide material. In this way, the metal oxide portions can function as non-conductive and/or RF transparent portions between the conductive metal portions. In some PEO embodiments, tools can be used during the PEO process to concentrate plasma generation at selected areas of the metal substrate such that those selected areas are oxidized to a greater extent than areas that do not have the concentrated plasma. This plasma concentration technique can be performed in addition to or instead of using a mask.

In some embodiments where the metal substrate is anodized prior to the oxidizing process, the metal oxide portion is formed beneath the anodized layer. Thus, if the anodized layer is dyed, the dyed anodized layer can cover both the metal oxide and the metal portions giving the part a uniform color and appearance. In other embodiments, the anodized layer and the metal oxide are undyed and have an inherently translucent quality. This translucent quality can be exploited in some applications where the metal oxide acts as a light window.

After the oxidizing process is complete, at 906 a post-oxidizing treatment can optionally be performed on the metal substrate. For example, in some cases a post-oxidizing dyeing process is performed. The dyeing process can dye the metal oxide portion and/or an anodized layer positioned over the metal oxide portion. This can give the part a uniform color and appearance. Other post-oxidizing treatments can include machining (e.g., cutting and/or shaping) and/or surface finishing processes to from a final part.

Figure 10:
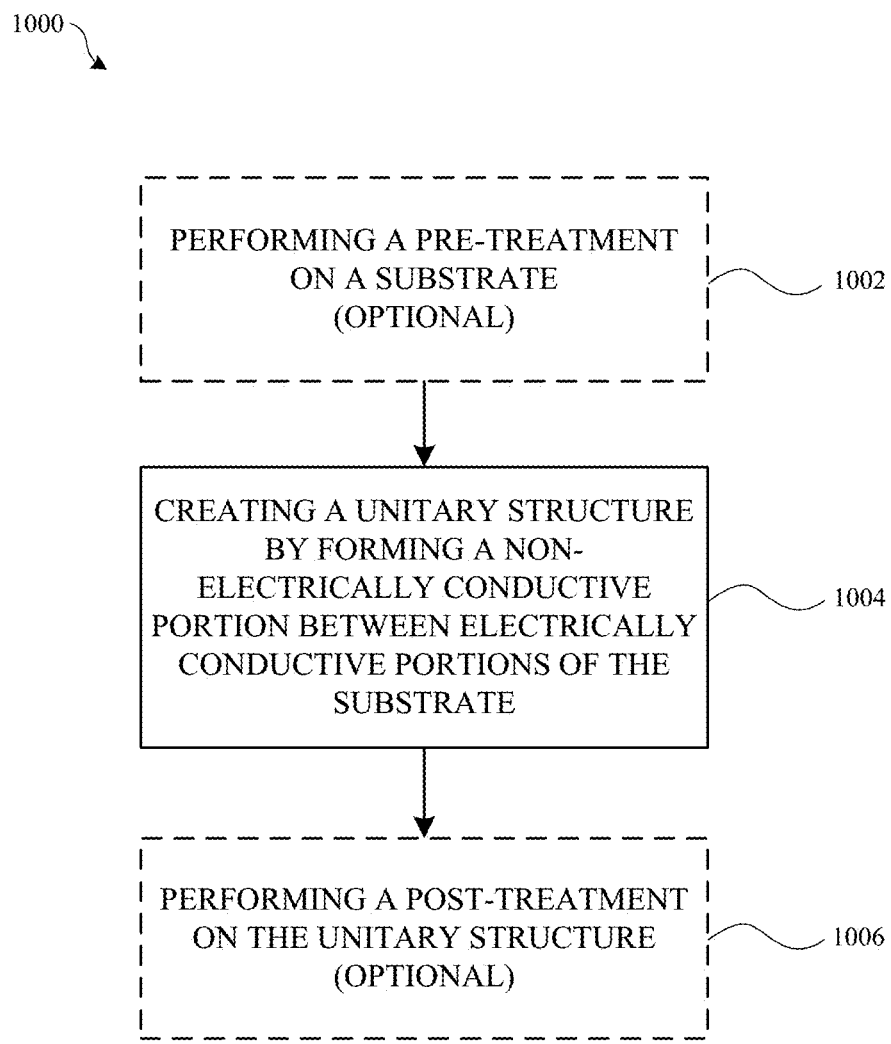
FIG. 10 shows a flowchart indicating a high level process for forming electrically isolated areas within a part, in accordance with some embodiments.

FIG. 10 shows flowchart 1000 indicating a high-level process for forming electrically isolated areas within a part, in accordance with some embodiments. At 1002, an optional pre-treatment is performed on a substrate. The pre-treatment can include machining operations to shape the substrate to a take on a pre-determined shape. In some cases, a surface finishing process is performed, such as an anodizing, polishing, and/or dyeing process, is performed.

At 1004, a unitary structure is created by forming a non-electrically conductive portion between electrically conductive portions of the substrate. In some embodiments, this involves a co-extrusion process where a non-conductive material, such as glass, plastic, or ceramic (e.g., a metal oxide) is co-extruded with a conductive material, such as a metal material. In some embodiments, an oxidizing process (e.g., anodizing and/or PEO) is used to convert a portion of a metal substrate to a corresponding metal oxide. At 1006, an optional post-treatment is performed on the unitary structure. For example, one or more machining or surface finishing processes can be performed. In some embodiments, portions of the unitary structure are dyed.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not meant to be exhaustive or to limit the embodiments to the precise forms disclosed. It will be apparent to one of ordinary skill in the art that many modifications and variations are possible in view of the above teachings.

What is claimed is:

1. An enclosure for an electronic device, the enclosure comprising:
   a unitary body including:
      a metal substrate having a first thickness and formed of an oxidizable metal, the metal substrate having a first external surface separated from a second external surface by a channel, wherein the channel is defined by lateral walls that extend away from the first and second external surfaces to a bottom wall of the channel that has a second thickness that is less than the first thickness; and
      a metal oxide layer that covers at least a portion of the bottom wall of the channel, the metal oxide layer separating the metal substrate into first and second metal portions that correspond to the first and second external surfaces, respectively, wherein the metal oxide layer has the second thickness and an external surface corresponding to a surface of the bottom wall.

2. The enclosure of claim 1, wherein the enclosure includes an electronic component, and the metal oxide layer is generally radio frequency transparent such that electromagnetic signals generated by the electronic component are transmittable through the metal oxide layer while being blocked by the first and second metal portions.

3. The enclosure of claim 1, wherein the first and second metal portions border the metal oxide layer, and the first and second metal portions have the second thickness.

4. The enclosure of claim 1, wherein the first and second metal portions are electrically conductive.

5. The enclosure of claim 1, wherein the metal oxide layer is isolated within the channel.

6. An enclosure for an electronic device, the enclosure comprising:
   a unitary metal substrate having a channel that defines a first metal portion having a first thickness and a second metal portion having a second thickness, the channel defined by sidewalls that extend into the unitary metal substrate and terminate at a bottom wall, the bottom wall having a thickness that is less than either of the first or second thicknesses, and wherein the bottom wall includes a metal oxide layer having the thickness of the bottom wall and a length of the channel.

7. The enclosure of claim 6, wherein the bottom wall further includes a non-oxidized metal layer in addition to the metal oxide layer.

8. The enclosure of claim 7, wherein the metal oxide layer is confined within the channel by the non-oxidized metal layer.

9. The enclosure of claim 6, wherein the metal oxide layer has a size and shape that corresponds to a shape and size of the channel.

10. The enclosure of claim 6, wherein the first and second metal portions are electrically conductive.

11. The enclosure of claim 6, wherein the enclosure includes an antenna capable of generating radio frequency (RF) signals, and the metal oxide layer is transparent to the RF signals.

12. The enclosure of claim 6, wherein an anodized layer covers the first metal portion, the second metal portion, and the metal oxide layer.

13. The enclosure of claim 12, wherein an external surface of the anodized layer includes dyed color particles.

14. A method of forming an enclosure for an electronic device, the enclosure including a metal substrate having a first metal portion and a second metal portion, the method comprising:
   forming a metal oxide layer over a bottom wall of the metal substrate that defines a channel that separates the first metal portion having a first thickness and the second metal portion having a second thickness, the channel defined by walls that extend from the first and second metal portions into the metal substrate and terminate at the bottom wall, wherein the bottom wall has a thickness that is less than either of the first or second thicknesses, and the metal oxide layer has an external surface corresponding to a surface of the bottom wall.

15. The method of claim 14, wherein, prior to forming the metal oxide layer over the bottom wall, the method further comprises:
   masking the first and second metal portions while leaving the bottom wall unmasked;
   immersing the metal substrate in an electrolytic solution; and
   applying an electric potential to the metal substrate.

16. The method of claim 15, further comprising:
   prior to applying the electric potential to the metal substrate, thinning the metal substrate at a location corresponding to the channel.

17. The method of claim 14, wherein the metal oxide layer includes metal oxide material that is radio frequency (RF) transparent.

18. The method of claim 14, wherein the first and second metal portions are electrically conductive.

19. A metal substrate, comprising:
   separate metal portions and channels that are arranged according to a pattern, such that at least one channel is disposed between at least two of the metal portions, wherein the at least one channel is defined by (i) peripheral metal portions, and (ii) a dielectric metal oxide portion bordered by the peripheral metal portions, thereby effectively electrically isolating the metal portions from each other such as to enable operation of an antenna that is enclosed by the metal portions.

20. The metal substrate of claim 19, wherein the operation of the antenna includes at least one of transmitting or receiving a radio-frequency signal.

* * * * *